I. LANGMUIR.

ELECTRON DISCHARGE APPARATUS.

APPLICATION FILED APR. 23, 1919.

Reissued Jan. 31, 1922. 15,278.

Inventor:
Irving Langmuir,
by Albert G. Davis
His Attorney.

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

ELECTRON-DISCHARGE APPARATUS.

15,278. Specification of Reissued Letters Patent. Reissued Jan. 31, 1922.

Original No. 1,273,783, dated July 23, 1918, Serial No. 795,609, filed October 16, 1913. Renewed March 14, 1916, Serial No. 84,241. Application for reissue filed April 23, 1919. Serial No. 292,218.

*To all whom it may concern:*

Be it known that I, IRVING LANGMUIR, a citizen of the United States, residing at Schenectady, in the county of Schenectady, State of New York, have invented certain new and useful Improvements in Electron-Discharge Apparatus, of which the following is a specification.

The present invention relates to electron discharge devices, for example, discharge tubes having an incandescent cathode.

Devices of this nature as described and broadly claimed in a copending application, Serial No. 795,610, filed October 16, 1913, are provided with an electron-emitting cathode, an anode, and a conducting body or auxiliary electrode, commonly termed a "grid," consisting ordinarily of an electrical conductor located between cathode and anode for statically controlling the electrical discharge conditions of the tube. Electron discharge devices as described in the above application may be operated at exceedingly high voltages and have a high load capacity. This new apparatus is suited for use in a much wider field than former devices of this nature which were limited to low voltages and very feeble currents.

The present invention comprises various structural features of novelty which coöperate to increase the range and capacity of a device of this type. For example, in accordance with my invention the grid is supported on a supporting frame-work in such manner that mechanical displacement of the grid by static strains or by mechanical shocks cannot easily occur. Other features of novelty are pointed out with particularity in the claims.

Figure 1:
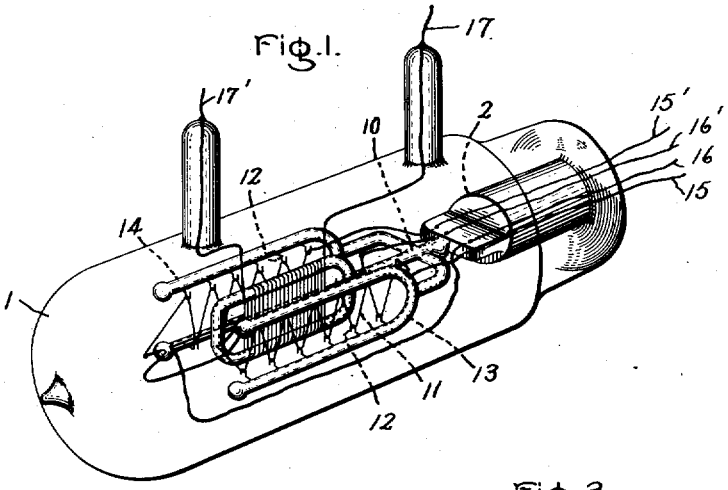

In the accompanying drawings various forms of apparatus are shown illustrative of my invention. Figure 1 illustrates an electron discharge tube with its parts assembled, and Figs. 2 to 5 inclusive, show alternative forms of electrode and grid constructions.

Figure 2:
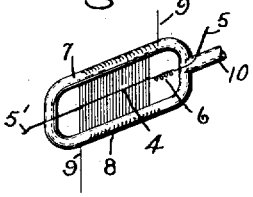

As shown in Fig. 1, the various parts of the apparatus may be mounted in an inclosing envelop or globe 1 upon a pedestal or press 2 similar to the mount employed for incandescent lamps. The cathode construction is shown in Fig. 2. It consists of a substantially straight filament 4 consisting of highly refractory material, preferably tungsten, and provided with terminals 5, 5′. The filament 4 is mounted, preferably attached to a light spring 6, between two oppositely disposed parallel rod supports or arbors 7 and 8 constituting a frame work, which may consist of insulating material, such as glass or quartz, but in some cases may to advantage consist of metal. Upon this frame-work is wound a wire 9 in the form of a flattened helix, which has such a small diameter or section that it is too yielding to retain without the aid of the framework a desired position or configuration. The turns of conductor are closely adjacent to each other and are also very closely adjacent to but are out of contact with the incandescent cathode. The conductor 9, which may be very fine and extends in the forms illustrated transversely across the space between the cathode and the anode, constitutes a grid which by means of applied potential exerts an electrostatic control upon the electron discharge.

The supporting frame-work for the cathode and grid is attached to a rod or arbor 10, mounted upon the stem of the tube. Adjacent to the cathode and grid is the anode or plate 11 which in the present case has been indicated as consisting of a wire strung in a zig-zag manner over hooks 12 upon fork-shaped supports 13 and 14 but it is not necessary that it should assume this particular form. As indicated, the anode also may consist of a conductor or wire which has such small section that it is not self-supporting and, therefore, is carried upon a framework which is upheld by the support which carries the grid framework, and as will be described in connection with Fig. 4, the second framework may be placed upon the first-mentioned framework carrying the grid conductor. Both anode and grid preferably consist of tungsten, but other gas-free refractory metals may be used. By constituting the anode a continuous conductor it can be conveniently heated by passage of current during evacuation of the device and for this purpose is attached to leading-in conductors 15, 15′. The cathode terminals 5, 5′ are supplied with current through leading-in wires 16, 16′. Although it is not necessary for all purposes to provide connections for each end of the grid it is desirable to do so when the potential applied to the grid is small and in the case of a straight or linear cathode the potential gradient along the grid may to advantage be the same as that on the filament. In this manner the potential drop from grid to cathode is the same along its length. The grid is indicated in Fig. 1 as being attached to leading-in conductors 17, 17′ at opposite ends.

Figure 3:
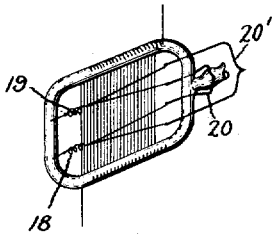

In some cases it is desirable to use a V-shaped incandescing conductor for the cathode and to attach to its bight a spring as shown at 18, 19 in Fig. 3. In this manner contact of the conductor with the grid by sagging when the metal is expanded at high temperature is prevented. In Fig. 3 a plurality of loops are used in order to increase the amount of cathode surface. The filaments are connected in parallel by means of conductors 20, 20′.

Figure 4:
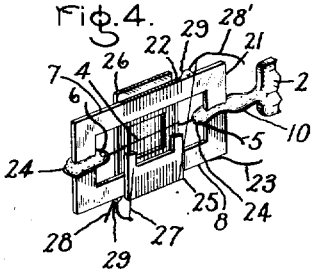

In Fig. 4 the cathode 4 has been shown as being mounted in a frame 21, consisting of ferrochrome, tungsten, or other suitable metal upon which the wire 22 constituting the grid is wound in the form of a flattened helix. As the grid wire is thus wound upon a conductive frame its turns are in parallel and electrical contact may be made directly to the frame 21 which constitutes a part of the grid electrode by conductor 23. The leading-in conductors 5, 6 for the cathode are insulated from the frame by glass supports 24 as indicated.

Upon the frame 21 are placed mica sheets 25 and 26 which serve to insulate the wire 27 which is wound in the form of a flattened helix constituting the anode or plate from the grid. The leading-in conductors 28, 28′ to which the ends of the wires are anchored may be attached to glass beads 29 fused upon the frame 21.

Figure 5:
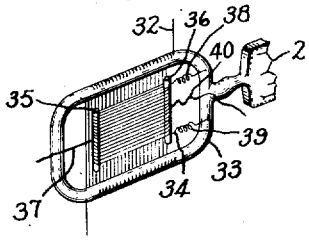

In Fig. 5 not only the grid 32 is wound upon the frame 33 but also the cathode wire 34 is wound upon stout straight metallic conductors or wires 35, 36, consisting preferably of tungsten in such a way as to form a flattened helix. The conductors 35, 36 are attached respectively to an anchoring wire 37 and to two springs 38 and 39 serving to hold taut the turns of the tungsten wire constituting the cathode and to prevent them from coming into contact with the grid wire 32. A stranded copper conductor 40 may be used to conduct current to the cathode.

In preparing the apparatus, the preliminary exhaust is carried out by the most improved methods such as used in incandescent lamp manufacture. The anodes or plates are then subjected to an electron discharge or bombardment by impressing a suitable voltage between the cathode and anode. When the anode consists of a conductor such as wire 11, Fig. 1, it is preferably heated by passage of current either before or during the bombardment. When the anode is plate-shaped the heating may form a part of the treatment by electron bombardment, the discharge current being made heavy enough to heat the anode, but heating is not essential. The removal of the gas from the anode is not due to heat alone, but is due to electrical effect. The voltage should be so chosen at the beginning of the electron discharge treatment that blue glow is absent in the tube as this indicates that ionization of the residual gas by collision of gas molecules with electrons is taking place and under these conditions disintegration of the cathode is apt to take place. The discharge voltage is progressively increased, the gas being removed as fast as evolved, preferably by a Gaede molecular pump. This treatment is ordinarily continued until the discharge voltage is higher than the voltage at which the device is normally operated but this rule will not hold true when the operating voltage is very high as substantially all the gas may be removed before the operating voltage is exceeded. Evacuation of the device should preferably be carried to a pressure as low as a few hundredths of a micron or even lower although no definite limits may be assigned. In any event evacuation should be so low that no appreciable gas ionization takes place during normal operation. When the cathode and anode are very close together and the discharge is confined to a direct path, a greater gas pressure is permissible than when the opposite is true.

An electron discharge tube may be used in various electrical systems, for example, as in receiving systems for radio-telegraphy. The passage of electron current across the evacuated space between cathode and anode is controlled by the potentials impressed upon the grid. A tube prepared as above described may be used to transmit currents limited in potential only by the dielectric strength of the glass, quartz or other material of the tube and the mechanical strength of parts subjected to static forces.

What I claim as new and desire to secure by Letters Patent of the United States, is:—

1. An electrical vacuum discharge apparatus comprising a highly evacuated envelop, a cathode adapted to be heated, a coöperating anode, a rigid framework, an unheated conductor, constituting a grid, wound back and forth on said frame-work with closely adjacent turns and located between cathode and anode, and external connections for said electrodes and said grid.

2. The combination of a highly evacuated envelop, a cathode, a cooperating anode, rods spaced apart and adjacent said cathode, a grid conductor having too small a diameter to be self-supporting wound over said rods with closely adjacent turns and having a plurality of sections transverse to said rods, and external connections for said electrodes and said grid.

3. An electron discharge apparatus comprising an evacuated envelop, an electron-emitting cathode, a coöperating anode, a frame-work spaced about said cathode, and a conductor wound about said framework closely adjacent said cathode.

4. An electron discharge apparatus comprising an evacuated envelop, a refractory conductor, connections for transmitting energy to incandesce said conductor, bars located on opposite sides of said conductor, a wire wound with closely adjacent turns on said bars to constitute a grid, but out of contact with said incandescing conductor, a second set of bars closely adjacent to the first set but insulated therefrom and a conductor constituting an anode mounted thereon in a plane substantially parallel to said grid, and leading-in conductors to said grid and anode.

5. A vacuum discharge tube comprising a highly evacuated envelop, a cathode adapted to be heated, a cooperating anode, a framework located adjacent thereto, a conductor mounted thereon, and having turns inclosing said cathode, and external connections for said electrodes and said conductor.

6. The combination of a gas-tight highly evacuated envelop, a filamentary conductor adapted to be heated, constituting a cathode, a frame consisting of conductive material spaced about said conductor, a conductor wound on said frame with closely adjacent turns surrounding said cathode and constituting a grid, insulating supports adjacent said grid, a second conductor constituting an anode wound upon said supports, and external current connections for said electrodes and grid.

7. An electrical device comprising the combination of an inclosing envelop, a cathode, means for causing said cathode to emit electrons, an anode, a self-supporting framework located between said electrodes, and an electrical conductor mounted on said framework and extending transversely to the direct path between said electrodes.

8. An electrical apparatus comprising the combination of a cathode adapted to emit electrons independently of the operating current, an anode, a supporting framework, a wire mounted on said framework, said wire having too small a cross-section to be self-supporting, constituting a charge-receiving grid, an inclosing evacuated envelop, and electrical connections for said electrodes and grid.

9. An electrical apparatus comprising the combination of a cathode, adapted to independently emit electrons, a supporting framework, a conductor having too small a section to be self-supporting mounted thereon, a second framework adjacent the first, a second conductor mounted on said second framework insulated from said first-named conductor, an inclosing envelop, and external connections for said elements.

10. An electrical apparatus comprising the combination of a cathode adapted to emit electrons, supporting bars located on opposite sides of said cathode, a wire wound on said bars to constitute a grid, a second set of self-supporting bars adjacent said first set but insulated therefrom, a second wire wound on said second set of bars, constituting an anode, an inclosing envelop, and external electrical connections for said cathode, grid and anode.

11. An electrical apparatus comprising the combination of an evacuated envelop, a supporting framework therein, a cathode mounted on said framework, an unheated conductor positioned to control an electrical discharge emitted by said cathode and extending transversely to a direct path between said cathode and anode, said conductor being also mounted on said framework, and a cooperating anode within said envelop.

12. An electrical apparatus comprising the combination of an evacuated gas-tight envelop, a supporting framework therein, a cathode carried by said framework, a discharge-controlling conductor also carried by said framework and surrounding said cathode and a cooperating anode within said envelop.

13. An electrical device comprising the combination of a supporting stem, framework carried thereby, a filamentary cathode of refractory material supported by said framework, a discharge-controlling conductor having too small a section to be self-supporting wound on said framework about and in close proximity to said cathode, a second framework also carried by said stem, an anode supported by said second framework, an inclosing evacuated envelop, and electrical leading-in conductors joined respectively to said cathode, said discharge-controlling conductor and said anode.

14. An electrical apparatus comprising the combination of an evacuated envelop, a supporting framework therein, a cathode mounted on said framework adapted to be operated at incandescence, a discharge-controlling conductor also mounted on said framework and extending transversely across the direct path between said cathode and anode, said conductor being of such small cross-section as to be unable to maintain a desired configuration without the framework, and a cooperating anode.

15. An electrical device comprising the combination of a supporting stem, a framework carried thereby, a cathode mounted on said framework, a discharge-controlling conductor also mounted on said framework, a second framework also carried by said stem, an anode supported by said second framework, an inclosing evacuated envelop, and electrical leading-in conductors sealed in said envelop and joined respectively to said cathode, said discharge-controlling conductor and said anode.

16. An electrical device comprising the combination of a supporting stem, a framework upheld thereby, a cathode of refractory material, a discharge-controlling conductor, both said cathode and conductor being carried by said framework and having such small section as to be too yielding to be self-supporting, a second framework also carried by said stem, an anode conductor too small in diameter to be self-supporting, carried by said second framework, an inclosing evacuated envelop and electrical leading-in conductors sealed into said envelop and each joined respectively to said cathode, said discharge-controlling conductor and said anode.

17. An electrical device comprising the combination of a framework, a filamentary cathode of tungsten supported by said framework, a tungsten wire wound with closely adjacent turns on said framework constituting a discharge controlling grid, a second framework closely adjacent the first framework, a second tungsten wire mounted on said second framework but out of electrical contact with the cathode and grid, a common support for both frameworks, an inclosing envelop evacuated to such low pressure that conduction of energy can occur therein substantially independently of positive gas ionization, and electrical leading-in conductors sealed into said envelop and connected respectively to said cathode, said grid and said anode.

18. An electrical device comprising the combination of a cathode, an anode, a framework having a plurality of arms spaced apart, a discharge-controlling conductor extending from one of said arms to another arm, transverse to a direct path between said cathode and anode, an inclosing envelop, and external connections for said electrodes and said conductor.

19. An electrical device comprising the combination of a refractory cathode, an anode, means for heating said cathode independently of a discharge between said cathode and anode, a framework located between said electrodes and an unheated conductor mounted on said framework and surrounding one of said electrodes, and an inclosing enevelop into which electrodes and said unheated conductor are sealed.

20. An evacuated envelop containing three electrodes one of which is a filament adapted to be heated, another a charge receiving anode, a self-supporting framework spaced about one of said electrodes, and a third electrode consisting of a wire mounted on said framework and located transversely to the space between said electrodes.

21. A thermionic device having a plurality of electrodes in immediate proximity to each other, and one supported by but held out of electrical contact with another electrode by an interposed dielectric.

22. A space current device comprising a plurality of electrodes, one of which is insulatingly supported by another electrode.

23. In an evacuated vessel, an electrode, insulating material supported by said electrode and another electrode supported by said insulating material.

24. A vacuum tube device of the audion type comprising an output electrode, a cathode and a control electrode, one of said electrodes being insulatingly supported by another of said electrodes.

25. A vacuum tube device of the audion type comprising a pair of plate electrodes with a filamentary electrode and an auxiliary electrode located between the electrodes of said pair, said filamentary electrode being insulatingly supported by another of said electrodes.

26. A vacuum tube device of the audion type comprising a pair of plate electrodes with a filamentary electrode and an auxiliary electrode located between the electrodes of said pair, said filamentary electrode being insulatingly supported by said auxiliary electrodes.

27. An evacuated vessel comprising an arbor, a pair of plate electrodes laterally disposed from said arbor and supported thereby, an electrode between said plate electrodes.

28. An evacuated vessel comprising an arbor, a pair of plate electrodes laterally disposed from said arbor and supported thereby, and cathode and control electrodes located between the members of said pair.

29. A vacuum tube device comprising a press, a pair of spaced parallel rods arising from said press, and more than two electrodes including a cathode located between said rods and supported thereby.

30. A vacuum tube device of the audion type comprising a plurality of electrodes, one of which is supported by another.

31. A vacuum tube comprising an arbor, an electrode supported thereby, and another electrode supported by said first mentioned electrode.

32. A vacuum tube device comprising anode and control electrodes, and a filamentary cathode insulatingly supported by one of said electrodes.

33. A vacuum tube device comprising anode and control electrodes, and a filamentary cathode insulatingly supported by said control electrode.

34. A thermionic device comprising a helical filamentary cathode, anode surfaces at opposite sides of said cathode, and a control electrode between said anode surfaces and adjacent said cathode.

35. An evacuated vessel containing a press, a straight wire supported above said press, a helical electrode supported by said wire, and a cooperating anode.

36. An evacuated vessel containing a press, a straight wire supported above said press, a helical cathode supported by said wire, and an anode associated with said cathode.

37. An evacuated vessel containing a press, a straight wire supported above said press, a helical cathode surrounding said wire and supported thereby, and a cooperating anode.

38. A thermionic device comprising an evacuated vessel, a pair of parallel plate electrodes surfaces, a plurality of parallel wires therebetween, and a helical electrode mounted on said wires.

39. An evacuated vessel comprising a press, a plurality of parallel wires supportingly connected to said press, a helical electrode mounted on said wires, anode surfaces at opposite sides of said electrode, and lead wires in said press for said electrodes.

40. A thermionic device comprising a plurality of helical electrode sections, one of which surrounds another.

41. A thermionic device comprising a cathode, an anode surrounding said cathode, a control electrode between said cathode and said anode, a single press within said tube, and supporting connections for said electrodes extending beyond said press.

In witness whereof, I have hereunto set my hand this 17th day of April, 1919.

IRVING LANGMUIR.